United States Patent
Green et al.

(10) Patent No.: US 6,439,197 B1
(45) Date of Patent: Aug. 27, 2002

(54) METHOD OF CONTROLLING THE IGNITION IN AN INTERNAL COMBUSTION ENGINE AND ENGINE WITH MEANS FOR CARRYING OUT THE METHOD

(75) Inventors: Henrik Green, Gothenburg; Jan Dahlgren, Torslanda, both of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/719,773

(22) PCT Filed: Jun. 18, 1999

(86) PCT No.: PCT/SE99/01109
§ 371 (c)(1),
(2), (4) Date: Feb. 26, 2001

(87) PCT Pub. No.: WO00/00739
PCT Pub. Date: Jan. 6, 2000

(30) Foreign Application Priority Data

Jun. 18, 1998 (SE) ................................................ 9802095

(51) Int. Cl.$^7$ ................................................. F02P 5/15
(52) U.S. Cl. ............................................... 123/406.55
(58) Field of Search ...................... 123/406.26, 406.48, 123/406.55, 406.58, 90.15–90.18

(56) References Cited

U.S. PATENT DOCUMENTS

| 4,191,144 A | * | 3/1980 | Nohira et al. ........... 123/406.48 |
| 4,314,540 A | * | 2/1982 | Ikeura .................... 123/406.48 |
| 4,881,509 A | * | 11/1989 | Ohashi et al. .......... 123/406.48 |
| 5,183,020 A | | 2/1993 | Hosoi |
| 5,273,019 A | * | 12/1993 | Matthews et al. ...... 123/406.48 |
| 5,482,020 A | * | 1/1996 | Shimizu et al. ......... 123/406.48 |

FOREIGN PATENT DOCUMENTS

| EP | 0 643 201 A1 | 3/1995 |
| JP | 9 209 895 | 8/1997 |

* cited by examiner

Primary Examiner—Erick Solis
(74) Attorney, Agent, or Firm—Young & Thompson

(57) ABSTRACT

A method of adapting the ignition timing in an internal combustion engine to the crankshaft position depending on variations in engine rpm, load and overlap between the inlet and exhaust valves. The ratio between combusted and non-combusted gas in cylinders is computed, and this ratio is utilized, in such a way that the greater the proportion of combusted gas there is, the earlier the ignition will be initiated. The invention also relates to an engine with a control unit and means for computing said ratio and controlling the ignition timing.

12 Claims, 2 Drawing Sheets

METHOD OF CONTROLLING THE IGNITION IN AN INTERNAL COMBUSTION ENGINE AND ENGINE WITH MEANS FOR CARRYING OUT THE METHOD

The present invention relates, firstly, to a method in an internal combustion engine with at least one cylinder, a crankshaft and at least one inlet valve and one exhaust valve for each cylinder, of adapting the ignition timing relative to the crankshaft position to variations in engine operating conditions, and, secondly, to an internal combustion engine with at least one cylinder, a crankshaft, at least one inlet valve and one exhaust valve and a control unit comprising means for initiating ignition dependent on signals from a sensor sensing the angle of he crankshaft.

Variations in engine load and rotational speed are some known factors which determine the ignition timing, i.e. whether the spark should be advanced or retarded during the compression phase of the engine, and it is general practice to control the ignition timing as a function of these factors to achieve optimum ignition timing for different operating conditions. Another factor affecting ignition timing is the amount of exhaust gas in the engine fuel-air mixture. The larger the proportion of exhaust in the fuel-air mixture, the more difficult it will be to ignite the mixture. The exhaust in the fuel-air mixture can either be those recirculated from the exhaust side of the engine to the intake side (Exhaust Gas Recirculation=EGR), which is common practice for reducing exhaust gas emissions during certain operating conditions, or they can be a result of overlap between the opening times of the inlet valve and the exhaust valve, i.e. that period when both valves are open at the same time during the exhaust and inlet phase of the engine. A certain amount of overlap is unavoidable in modem engines, in order to achieve efficient gas exchange, but this overlap also results in so-called internal EGR, reducing the emissions in the exhaust.

The overlap is primarily determined by the cam angles of the valves and is in practice constant in most engines with hydraulic valve lifters with automatic valve play compensation. Engines with variable cam angles have been developed of late, making it possible to vary the lift curves of the valves depending on the operating making it possible to vary the lift curves of the valves depending on the operating conditions of the engine, to thereby increase engine efficiency. The valve overlap will thus be varied and with it the proportion of exhaust in the engine combustion chamber during the compression stroke. Such valve systems with variable valve times are known by, e.g., U.S. Pat. No. 5,209,202, which also describes ignition control as a function of cam angle.

In engines lacking hydraulic valve lifters with automatic valve play compensation and which have different materials in the valve mechanism and the cylinder head, e.g. steel and aluminium, with different thermal expansion coefficients, the valve play varies with varying temperature, resulting in undesired variations in valve overlap. The temperature differential from cold start to operating temperature can exceed 150° C. during the winter, which will result in a substantially greater overlap when the engine is cold than when it has reached operating temperature.

One purpose of the present invention is, in general, to achieve a method of controlling ignition timing which takes into account not only variations in engine load and rotational speed but also variations in the lift curves of the valves.

This is achieved according to the invention by virtue of the fact that the ignition timing is varied in relation to variations in the period of time when the inlet and exhaust valves are open at the same time, by computing the ratio between combusted and non-combusted gas in the combustion chambers of the cylinders and utilizing this ratio in such a manner that the larger the proportion of combusted gas is, the earlier the ignition will be initiated.

An additional purpose of the present invention is to achieve an engine which is equipped to control ignition timing in the above-mentioned manner.

This is achieved according to the invention in an engine of the type described by way of introduction, by virtue of the fact that the control unit has means for computing the ratio between combusted and non-combusted gas in the combustion chambers of the cylinders and controlling the ignition timing so that the greater the proportion of combusted gas there is, the earlier the ignition will be initiated.

It is to be understood in this respect that advancing the spark or moment of ignition presupposes that all of the other controlling parameters for the ignition timing are unchanged. The combustion will take place under a longer time period, which is advantageous since exhaust gases cause the flame front to propagate more slowly.

The ratio between exhaust and fresh air can be measured with the aid of sensors directly in the combustion chamber, but even if this is technically possible, it is not practical outside the laboratory.

The ratio between combusted and non-combusted gas can, in accordance with the invention, be computed indirectly with the aid of the ratio between the temperature of the valves and the temperature of the cylinder heads. By measuring the temperature of the engine coolant and the airflow to the combustion chambers of the cylinders, said temperature ratio can be determined. The temperature of the cylinder head and the inlet valve is essentially equal to the coolant temperature. The temperature of the exhaust valve can, despite the fact that it is much higher, be calculated on the basis of the coolant temperature with a correction factor, which is proportional to the engine load, which in this case is equivalent to the air mass in the cylinder per stroke.

BRIEF DESCRIPTION OF THE DRAWINGS

The invention will be described in more detail below with reference to examples shown in the accompanying drawings, where.

DETAILED DESCRIPTION

Figure 1A:
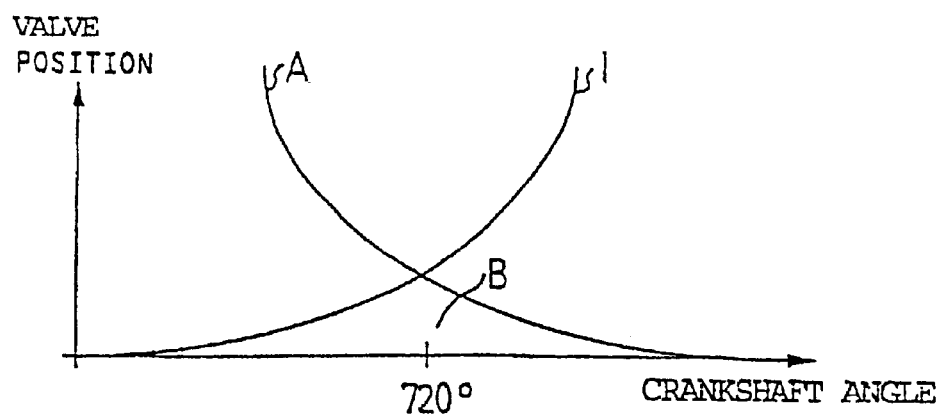
FIGS. 1A, 1B and 1C show diagrams of portions of the lifting curves of the exhaust and inlet valves under various operating conditions.

FIG. 1A shows the crankshaft angle range on either side of the top dead centre of the piston, i.e. 720 crankshaft degrees, with the end of the lift curve A of the exhaust valve and the beginning of the lift curve I of the inlet valve for a certain valve setting. As can be seen from the lift curves A and I, the inlet valve begins to open during the end of the exhaust phase before the piston has reached its top dead centre point, while the exhaust valve closes completely only somewhat into the inlet stroke after the top dead centre, which means that a certain amount of exhaust will be drawn into the cylinder. The overlap is here defined by the area B enclosed between the lift curves A and I and the x-axis of the diagram.

Figure 1B:
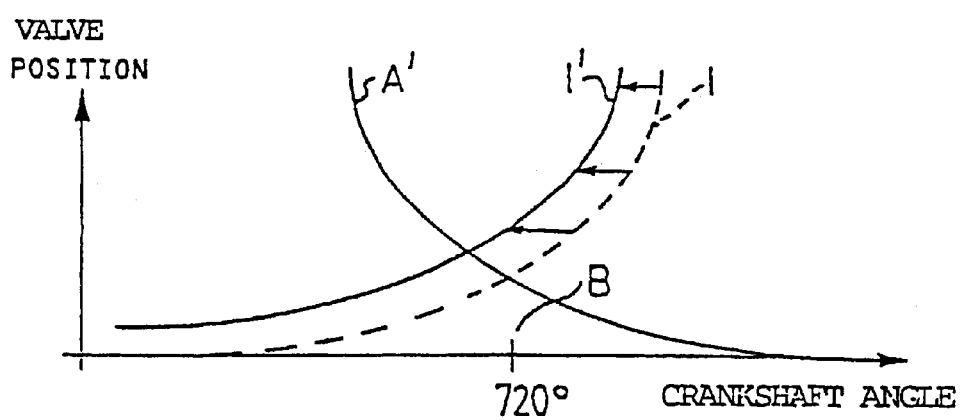

FIG. 1B is a diagram corresponding to FIG. 1A, but with a changed valve lift curve of the inlet valve. The dashed line shows the lif curve I for the inlet valve and the solid line shows the new lift curve I', which is achieved by changing the cam times of the valve with the aid of an adjustable camshaft, i.e. the rotational angle of the camshaft relative to the crankshaft angle is changed, resulting in a horizontal displacement of the curve in the diagram. As can be seen in the diagram, the overlap area B' is substantially enlarged compared to the area B in FIG. 1A.

Figure 1C:
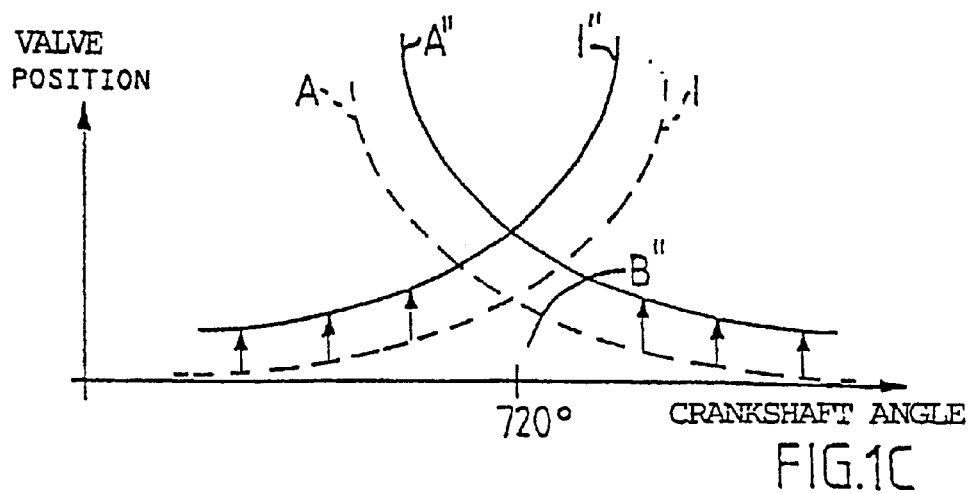

FIG. 1C shows a diagram where the lift curves A and I (corresponding to FIG. 1A) are dashed. The new exhaust valve curve A" and the inlet valve curve I' are the result of a change in the length of the valves (primarily the valve spindles) relative to the dimension of the cylinder head in the direction of the valve spindle. This change, which is due to differing longitudinal expansion due to different materials in the cylinder head and the valve mechanism, e.g. aluminium and steel with different coefficients of expansion, results in an entirely vertical displacement of the lift curves. Even small changes in the valve lengths result in significant changes in the overlap area B", as can be seen in FIG. 1C.

Figure 2:
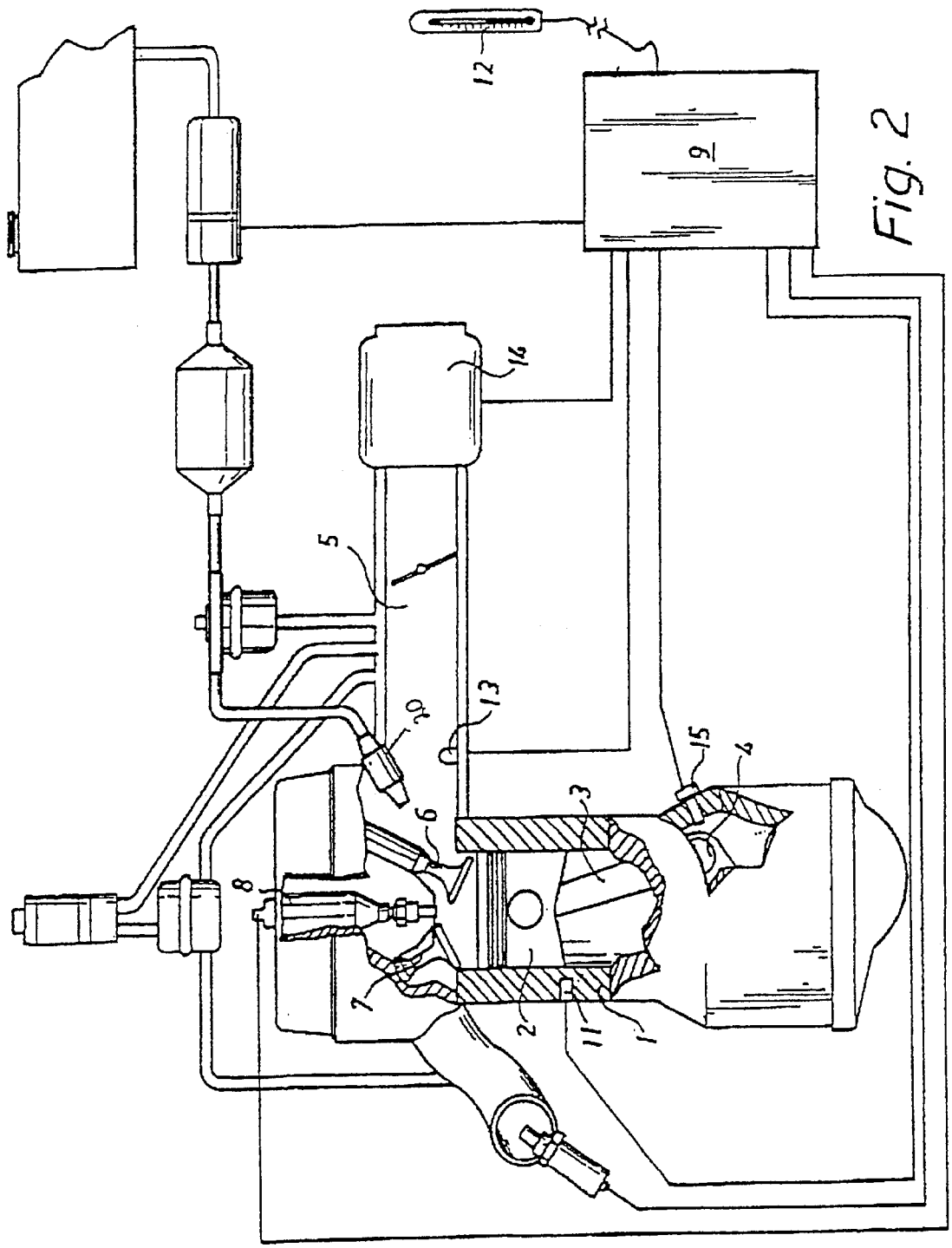
FIG. 2 shows a partially cut-away view of an engine according to the invention with a schematic representation of the ignition system.

Variations in valve overlap cause variation in the amount of exhaust in the cylinder combustion chambers during the compression stroke. FIG. 2 shows an engine with an ignition system, which, in addition to controlling the spark advance as a function of known control parameters, such as r.p.m. and load, also includes the amount of exhaust in the fuel air mixture as a controlling parameter.

1 in FIG. 2 designates the cylinders of a four-stroke Otto engine. The pistons 2 of the engine are connected via connecting rods to a crankshaft 4. An inlet conduit 5 opens into an inlet channel in which an inlet valve 6 is disposed. In an exhaust channel there is disposed an exhaust valve 7. The valve movement of the valves can be achieved with a valve mechanism, not shown in more detail here, comprising valve lifters, camshafts and valve springs.

8 designates a spark plug with an ignition coil, which is electrically connected to a control unit 9, which is preferably a microprocessor which controls the ignition timing, i.e. the position relative to the position of the crankshaft (the position of the piston in the cylinder chamber during the compression stroke), at which the fuel-air mixture is to be ignited. The control unit 9 is furthermore electrically connected to: a temperature sensor 11, which senses the engine temperature or the coolant temperature; an outside temperature sensor 12; a pressure gauge 13; an air mass meter 14 in the inlet conduit 5; and a tachometer 15. If the engine has camshafts with variable cam angles, there is also a cam angle meter connected to the control unit.

The control unit 9 controls in a known manner both the ignition timing and the fuel injection timing as well as the amount of fuel as a function of i.a the engine speed, which is obtained via the tachometer 15, and the load which is obtained via the air mass meter 14. According to the invention the ratio between combusted and non-combusted gases in the engine combustion chambers is also included as a parameter for controlling the ignition timing. The control unit thereby regulates the ignition in such a manner that the greater the portion of combusted gas there is, the earlier the ignition will be initiated, due to the fact that the propagation of the frame front is slower with increasing proportion of combusted gas.

Signals to the control unit indicating the proportion of combusted to non-combusted gases, can be obtained from a sensor disposed directly in the cylinder 1, but for a number of reasons it is desirable to avoid sensors directly in the engine cylinders.

As was disclosed in the introduction to the description, the ratio between combusted and non-combusted gases is dependent on the amount of fresh air supplied and the size of the overlap area between the lift curves I, A of the exhaust and inlet valves 6, 7. As was described in connection with FIGS. 1A–1C, these curves can vary either due to variations in the cam angles or due to variations in temperature expansion differentials between the valve mechanism and the cylinder head, or a combination thereof.

In an engine with automatic valve play compensation and variable cam times, the overlap area, and thus the ratio between combusted and non-combusted gases, can be computed directly in the control unit via signals from the cam angle meter (not shown), which senses variations in the cam angle of the camshafts, the pressure gauge 13 and the air mass meter 14, which senses the amount of fresh air supplied to the cylinder.

In an engine without automatic valve play compensation, the valve play and thus the overlap area vary depending on said differences in longitudinal expansion between the valve mechanism, primarily the valve spindle, and the dimension of the cylinder head in the spindle direction. The relative lengths of the valves 6, 7 and the cylinder head can be determined on the basis of, firstly, the temperature of the valves and of the cylinder head and, secondly, of their respective temperature dependencies so that the exact opening and closing points, and thereby also the overlap, can be estimated.

The temperature of the cylinder head and of the inlet valve 6 is in this case substantially equal to the coolant temperature and is obtained from the temperature sensor 11. The temperature of the exhaust valve 7 is substantially higher, but can be computed with the aid of the coolant temperature with a correction proportional to the engine load, which is in turn proportional to the mass of air in the cylinder per stroke measured by the sensor 14. The load changes rapidly during transient openings and closings of the gate, while the changes in temperature occur with a specific time constant dependent on inertia. The temperatures are calculated ahead of time and stored in a table in the control unit 9.

An amount of exhaust dependent on the overlap flows, during the exhaust stroke, into the inlet conduit. The total pressure in the inlet conduit, which is the sum of the partial pressures of the exhaust and the fresh air, is measured with the aid of a pressure gauge 13. The exhaust pressure can be calculated with the aid of the overlap computed in the above-described manner, so that the partial fresh air pressure is obtained.

Since the inlet conduit 5 contains a certain volume of gas, there is a time constant between an airflow in the inlet conduit 5 and an airflow in the combustion chamber. When the gate is opened, the volume in the inlet conduit is filled before air flows into the combustion chamber. This time constant is compensated by measuring the air mass flow with the meter 14 placed at the beginning of the inlet conduit. The time constant is strongly dependent on differences in pressure between the two ends of the inlet conduit. The pressure close to the cylinder is determined by the overlap, since the exhaust pressure in the inlet conduit increases with increasing overlap. Preferably, the calculated overlap area is used as an input signal to compute the load, which constitutes the basis for calculating the point of ignition.

Since the ignition timing is always primarily determined by the engine load and r.p.m., obtained from the sensors 14 and 15, respectively, the r.p.m. can also be included with advantage when computing the temperature of the exhaust valve 7, and thus the overlap. The above described control suitably occurs with the aid of tables or functional relationships, stored in the control unit 9, which produce output signals depending on the input parameters, to control the ignition timing. The tables are created by optimisation measurements, when varying the values of the input parameters, preferably one at a time. Optimisation is suitably done based on measured values of torque and exhaust emissions, so that a high a torque as possible is obtained without exceeding predetermined emission limits. Further parameters, which can be used to improve the control, can be outdoor temperature via the sensor 12, the temperature of the air in the inlet conduit etc.

The control of the ignition in relation to the crankshaft position by means of the control unit 9 has been described above. The fuel injection timing and the fuel amount are, of course, also controlled in a known manner in relation to the ignition timing, so that fuel injection timing and amount are varied as well relative to the overlap (overlap area) of the valves.

The embodiment shown and described with reference to FIG. 2 of the engine according to the invention is an engine with spark ignition, but the invention also encompasses diesel engines, where the control of the ignition, instead of relating to the control of the timing of the spark of the spark plug via the ignition coil, relates to control of the injection timing of the diesel fuel into the combustion chamber. Nor is the invention limited to engines with camshaft control valves, where the varying valve movements depend on varying valve play and/or varying cam periods. Varying valve movements can be similar variations in movement of the valves controlled in another manner, e.g. by means of electromagnets or the like.

What is claim is:

1. Method in an internal combustion engine with at least one cylinder, a crankshaft and at least one inlet valve and at least one exhaust valve for each cylinder, of adapting the ignition timing relative to the crankshaft position to variations in engine operating conditions, characterized in that the ignition timing is varied in relation to variations in the period of time when the inlet and exhaust valves are open at the same time, by computing the ratio between combusted and non-combusted gas in the combustion chambers of the cylinders and utilizing this ratio in such a manner that the larger the proportion of combusted gas is, the earlier the ignition will be initiated.

2. Method according to claim 1, characterized in that the temperature of the valves and the cylinder head of the cylinders is computed and that the ratio between combusted and non-combusted gas is determined based on the ratio between said temperatures.

3. Method according to claim 2, characterized in that the temperature of the engine coolant and the airflow to the combustion chamber of the cylinders are measured and that the temperature of the valves and the engine cylinder head is determined based on said temperature and flow.

4. Method according to claim 1, adapting the timing relative to the angular position of the crankshaft in an engine, in which at least the inlet valves are controlled by a camshaft with variable cam angles, characterized in that the ratio between combusted and non-combusted gas is computed based on the cam angles of the inlet and exhaust valves.

5. Internal combustion engine with at least one cylinder, a crankshaft, at least one inlet valve and at least one exhaust valve and a control unit comprising means for initiating ignition dependent on signals from a sensor sensing the crankshaft angle, characterized in that the control unit has means for computing the ratio between combusted and non-combusted gas in the combustion chambers of the cylinders and controlling the ignition timing so that the greater the proportion of combusted gas there is, the earlier the ignition will be initiated.

6. Engine according to claim 5, characterized in that the control unit is connected to a temperature sensor, which senses the temperature of the engine coolant, and a flow sensor which senses the airflow to the combustion chambers of the cylinders, and has means, depending on signals from said sensors, for computing the ratio between combusted and non-combusted gas.

7. Engine according to claim 6, characterized in that the flow sensor has a flow meter and a pressure gauge in the inlet conduit of the engine, said pressure gauge being disposed in the vicinity of the inlet valve.

8. Engine according to claim 7, characterized in that the control unit is connected to an engine speed sensor and has means for correcting signals from the airflow sensor depending on signals from the engine speed sensor.

9. Engine according to claim 5, characterized in that it has a camshaft with variable cam angles, which controls the movement of the inlet valve, and a cam angle sensor, which is disposed to provide the control unit with a signal dependent on the cam angle of the camshaft.

10. Engine according to claim 6, characterized in that it has a camshaft with variable cam angles, which controls the movement of the inlet valve, and a cam angle sensor, which is disposed to provide the control unit with a signal dependent on the cam angle of the camshaft.

11. Engine according to claim 7, characterized in that it has a camshaft with variable cam angles, which controls the movement of the inlet valve, and a cam angle sensor, which is disposed to provide the control unit with a signal dependent on the cam angle of the camshaft.

12. Engine according to claim 8, characterized in that it has a camshaft with variable cam angles, which controls the movement of the inlet valve, and a cam angle sensor, which is disposed to provide the control unit with a signal dependent on the cam angle of the camshaft.

* * * * *